UNITED STATES PATENT OFFICE.

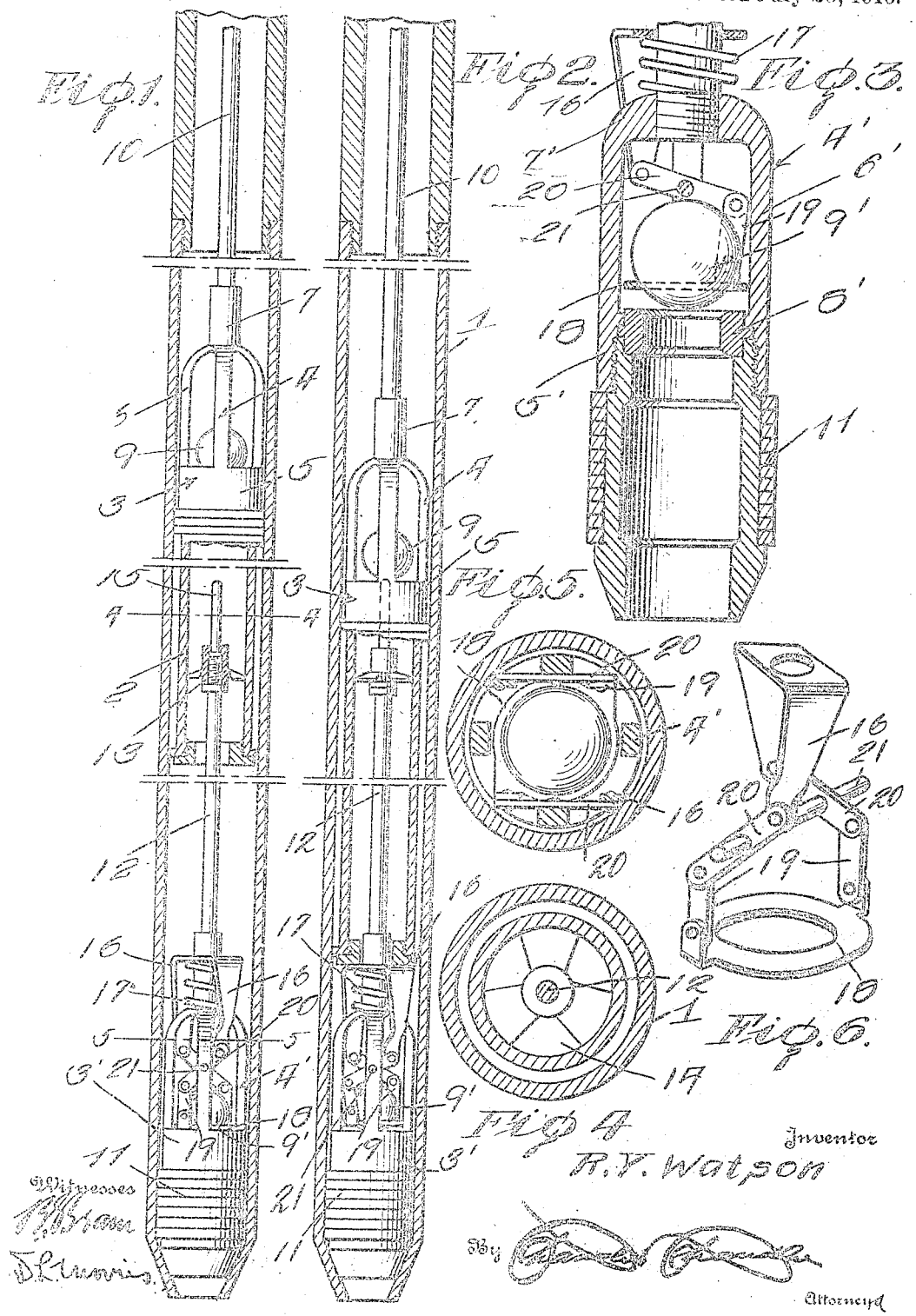

ROBERT Y. WATSON, OF TAFT, CALIFORNIA.

TRIP-VALVE FOR OIL-WELL PUMPS.

1,192,587. Specification of Letters Patent. Patented July 25, 1916.

Application filed September 28, 1914. Serial No. 864,003.

*To all whom it may concern:*

Be it known that I, ROBERT Y. WATSON, a citizen of the United States, residing at Taft, in the county of Kern, State of California, have invented certain new and useful Improvements in Trip-Valves for Oil-Well Pumps; and I do hereby declare the following to be a full, clear, and exact description of the invention, such as will enable others skilled in the art to which it appertains to make and use the same.

This invention relates to a trip valve for oil well pumps.

An object of the invention is to provide a device of this character by means of which the balls in the top and bottom valve of an oil pump may be displaced when the rod of the plunger becomes disassembled.

A further object of the invention is to so construct the device that the balls of the valves will be raised and maintained in their raised position automatically by the plunger so that the oil may escape from the tubing and prevent the pump from "sanding up".

With these and other objects in view, such as will appear as the description progresses, my invention comprises the combination and arrangement of parts as herein set forth and subsequently claimed.

Referring to the drawing: Figure 1 is a sectional view of the pump with the ball cages in elevation and my device in its inoperative position. Fig. 2 is a similar view showing the device in operative position. Fig. 3 is a longitudinal sectional view of my device. Fig. 4 is a section on line 4—4 of Fig. 1. Fig. 5 is a section on line 5—5 of Fig. 1. Fig. 6 is a perspective view of the ball raising mechanism, detached from the valve.

Referring to the drawings by reference characters wherein like parts are indicated by like characters throughout the several views:—the reference character 1 designates the usual well casing in which is operable a tubular plunger 2. Secured to the upper end of this plunger is a valve 3, which valve comprises a cage 4 which consists of a collar 5 from which extends upwardly four legs 6 which converge at their upper ends and form a head 7. In this collar 5 is located a valve seat in which a ball 9 is located, which ball is operable between the legs 6 of the cage 4. Connected to the head 7 is an upwardly extending pump rod 10 which is composed of a plurality of sections screwed together.

In the lower end of the casing 1 is located a plunger 11, on which a valve 3' having a cage 4' which is of similar formation to that of the cage 4 and has upwardly extending legs 6' terminating in a head 7'. In the collar 5' is located a valve seat 8' in which is operable a ball 9' in a manner similar to that in which the ball 9 is operable. Secured to the head 7' of the cage 4' is an upwardly extending rod 12 which is slidably engaged with the plunger 2.

In operation the plunger 2 is raised and lowered intermittently by the rod 10 and as the said plunger 2 is lowered the ball 9 rises and allows the oil which is in the casing 1 above the plunger 2 to be drawn upwardly and the oil thereabove will be drawn from the well at the same time the ball 9' will be raised and the oil will be let into the casing 1 above the cage 4' and below the plunger 2.

Thus it will be readily seen that the casing 1 is entirely filled with oil when the plunger 2 is in its lowermost position and this oil of course has a great deal of foreign substance such as sand and the like therein. It frequently happens that when the plunger is in this position, the rod 10 will become broken and thus the outward pumping of the well will be prevented and the sand which is in the oil or said plunger will settle and rest on the same so that it will be very difficult if not impossible to thereafter withdraw the plunger from the casing. When the rod 10 breaks or becomes unscrewed naturally the plunger 2 falls downwardly and in order that the balls 9 and 9' may be raised so as to allow the oil in the casing 1 to flow back and out of the said casing, I have provided mechanism which will be operated by the falling plunger.

On the upper end of the rod 12 is secured a collar 13 which is of circular formation and of a diameter slightly less than the diameter of the plunger 2 so as to be operable in the same. A series of peripheral notches 14 are formed in the said collar 13 so that the oil may rise through the said notches and into the upper part of the casing through the valve 3. Secured to this collar 13 and extending upwardly therefrom is a stub shaft 15 which is adapted to project through the valve 3 and impinge against the ball 9 so as to raise the same when the plunger 2 falls. Thus the oil will be allowed to flow from above the plunger to a position below the plunger and above the valve 3. However, in order that the oil may escape through the valve 3 and from the casing 1, I have provided on the lower end of the rod 12 a slidable U-shaped member 16, the legs of which extend downwardly and between two ends of the legs 6' of the valve 3'. This member 16 is normally held upwardly by a coil spring 17 which encircles the rod 12 between it and the head 7'.

Located between the ball 9' and the seat 8' is a collar 18 on which the said ball 9' rests and to this collar at diametrically opposite points are pivoted arms 19 which are pivoted at their upper ends to levers 20. These levers are pivotally supported by a transversely extending shaft 21 which is secured to two of the legs 6' and the other ends of the levers 20 are pivotally secured to the ends of the legs of the U-shaped member 16 so that when the said member 16 is moved downwardly the levers 20 will be moved about their pivots to raise the collar 18 and thus unseat the ball 9'. This U-shaped member 16 is so located on the rod 12 that when the plunger 2 moves downwardly it will strike against the upper bight portion of this member 16 and by virtue of the weight of the said plunger the member 16 will be moved downwardly and the operation just described completed. This raising of the ball 9' will be simultaneous with the raising of the ball 9 and when both of these balls are raised, the oil from the casing 1 will be allowed to flow back through the valve in said casing and thence out of the said casing and this will carry with it the sand which is in the oil and thus prevent the pump from getting "sanded up", that is to prevent the same from resting on the top of the said plunger in such manner that it will be difficult if not impossible to thereafter lift the plunger.

From the foregoing description it may be seen that I have provided a device which when the rods of an oil pump break will be operated by the falling of the plunger so as to allow the oil in the casing to flow back through the casing together with the sand suspended in the oil and thence from the casing so that the sand will not collect above the plunger of the pump. I have further so constructed the device that the valve in the pump will be automatically operated by the falling of the plunger.

While I have illustrated and described a particular embodiment of my invention, it has merely been for the sake of convenience and I do not want to be limited to that particular embodiment for it is obvious that numerous changes may be made within the construction of the device without departing from the spirit of the same, nor without exceeding the scope of the claims.

What is claimed is:—

1. In a device of the class described, a casing, a plunger slidably mounted in said casing, a valve secured to the upper end of said plunger, said valve comprising a seat, a spherical member removably mounted in said seat, and a cage to limit the movement of said ball, a valve in the lower end of said casing, said valve comprising a seat, a spherical member mounted in said seat and a cage inclosing said spherical member, an upwardly extending rod secured to the upper end of said cage and adapted to project within the plunger, an inverted U-shaped member slidably mounted on said rod, levers pivotally secured to the said cage, a collar located beneath the said last mentioned spherical member, a link connecting said levers to said collars, and a resilient member interposed between the upper end of the said cage and the said U-shaped member to maintain the same in its uppermost position.

2. In a device of the class described, a casing, a hollow cylindrical plunger slidably mounted in said casing, a valve on the upper end of said plunger, said valve consisting of a seat, and a spherical member mounted in said seat, a rod for reciprocating said plunger, a valve located in the lower end of said casing comprising a seat and a spherical member mounted in said seat, a cage mounted on said valve and extending over the spherical member therein, an upwardly extending rod secured to said cage and adapted to project within said plunger, a U-shaped member slidably mounted in said rod, a collar located beneath the lowermost spherical member, levers operatively connected to said U-shaped member and to said collar, and a spring interposed between the upper end of the said cage and the said U-shaped member to normally maintain the collar in its lowermost position, the said rod adapted to engage the uppermost ball on the downward movement of the plunger and unseat the same and the said U-shaped member being so constructed and arranged that the lower end of the plunger will engage the same during the downward movement and unseat the lowermost ball.

3. In a device of the class described, a casing, a plunger mounted in said casing, a valve in said casing, said valve consisting of a collar, legs extending upwardly from said collar and converging at the upper end thereof, a rod extending upwardly from said legs, a U-shaped member slidably mounted on said rod, a spring interposed between the end of the legs and the said U-shaped member, levers pivotally secured to the said legs, a valve seat located within the collar, a spherical member adapted to be seated in said seat, a collar situated between said spherical member, and links connecting the aforementioned levers and the said collar to normally lift the ball when the said U-shaped member is depressed.

In testimony whereof I affix my signature, in the presence of two witnesses.

ROBERT Y. WATSON.

Witnesses:
 HUGH L. COLLINS,
 J. N. RIPPLE.